United States Patent
Jin et al.

(10) Patent No.: US 7,153,535 B2
(45) Date of Patent: Dec. 26, 2006

(54) PROTEIN SWEETENER

(75) Inventors: Zheyuan Jin, Madison, WI (US); John L. Markley, Madison, WI (US); Fariba M. Assadi-Porter, Madison, WI (US); Bengt G. Hellekant, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 781 days.

(21) Appl. No.: 10/406,377

(22) Filed: Apr. 3, 2003

(65) Prior Publication Data

US 2004/0018290 A1 Jan. 29, 2004

Related U.S. Application Data

(60) Provisional application No. 60/370,646, filed on Apr. 8, 2002.

(51) Int. Cl.
C07K 14/415 (2006.01)
(52) U.S. Cl. ................ 426/548; 536/23.6; 530/324
(58) Field of Classification Search ............. 426/548; 536/23.6; 530/324, 370; 435/69.1
See application file for complete search history.

(56) References Cited

U.S. PATENT DOCUMENTS

| 5,326,580 A | 7/1994 | Hellekant et al. |
| 5,346,998 A | 9/1994 | Hellekant et al. |
| 5,527,555 A | 6/1996 | Hellekant et al. |
| 5,741,537 A | 4/1998 | Hellekant et al. |

| 6,274,707 B1 * | 8/2001 | Markley et al. ............ 530/350 |

FOREIGN PATENT DOCUMENTS

| WO | WO 94/19467 | 9/1994 |
| WO | WO 95/31547 | 11/1995 |
| WO | WO 00/61759 | 10/2000 |

OTHER PUBLICATIONS

H. Izawa et al., The Structure-Activity Relationships Of The Sweet Proteen Brazzein—Roles Of Acidic Amino Acids, Pept. Sci.: Present Future, Proc. Int. Pept. Simp., 750-751 (1999).
J. Caldwell et al., Solution Structure Of The Thermo Stable Sweet-Tasting Protein Brazzein, 5 Nature Structure Biology 427-431 (1998).
A. Hinck et al., Overexpression And Purification Of Avian Ovomucoid Third Domains in E. coli, 6 Prot. Engin. 221-227 (1993).
B. Green et al., Evaluating the "Labeled Magnitude Scale" For Measuring Sensations Of Taste And Smell, 21 Chemical Senses 323-334 (1996).
F. Assadi-Porter et al., Efficient Production Of Recombinant Brazzein, A Small, Heat-Stable, Sweet-Tasting Protein Of Plant Origin, 376 Arch. Biochem Biophys. 252-258 (2000).
F. Assadi-Porter et al., Sweetness Determinant Sites Of Brazzein, A Small, Heat-Stable, Sweet-Tasting Protein, 376 Arch. Biochem Biophys. 259-265 (2000).

(Continued)

*Primary Examiner*—Keith Hendricks
(74) *Attorney, Agent, or Firm*—Quarles & Brady LLP (57) ABSTRACT

Disclosed herein are sweet proteins that are variants of Brazzein, and nucleotide sequences capable of expressing them. Through a replacement of a particular amino acid in the naturally occurring Brazzein sequence with Lys or Asn, the taste profile and sweetness strength are improved.

5 Claims, 4 Drawing Sheets

OTHER PUBLICATIONS

G. Hellekant et al., Primate Sense Of Taste: Behavioral And Single Chorda Tympani And Glossopharyngeal Nerve Fiber Recordings In the Rhesus Monkey, Macaca Mulatta, 77 J. Neurophysiol. 978-993 (1997).

D. Ming et al., Characterization And Chemical Modification Of Brazzein, A High Potency Thermostable Sweet Protein From Pentadiplandra Brazzeana, 18 Acta Bot. Yunnanica 123-133 (1996).

* cited by examiner

Sweet-Sucrose

Brazzein wild type

Glu36Ala

Asp29Asn

FIG. 4

PROTEIN SWEETENER

CROSS-REFERENCE TO RELATED APPLICATIONS

This invention claims priority based on U.S. provisional application No. 60/370,646 filed Apr. 8, 2002.

STATEMENT REGARDING FEDERALLY SPONSORED RESEARCH/DEVELOPMENT

This invention was made with United States government support awarded by the following agency: NIH RR02301. The United States has certain rights in this invention.

BACKGROUND OF THE INVENTION

The present invention relates to sweet proteins. Specifically, this invention relates to Brazzein protein that has been modified to improve its sweetness characteristics.

The most widely used natural sweetener, sugar (sucrose), has significant problems associated with its use (especially causing weight gain by users). Many other sweeteners either have undesirable side effects or are deficient in certain respects. For example, aspartame loses its sweetness when exposed to elevated temperatures for long periods. This renders aspartame unsuitable for use in most baking applications.

Moreover, most existing artificial sweeteners have temporal sweetness profiles which do not adequately match that of sugar. For example, their sweetness may die out sooner or leave an undesirable after taste, and/or may be perceived sooner than sugar. It may therefore be desirable to mix an existing artificial sweetener with one or more other sweeteners having different temporal profiles (so as to create a mixed sweetener that more closely matches the overall temporal sweetness profile of sugar).

Only relatively few sweet proteins (as distinguished from sweet carbohydrates) have been found in nature. One protein that appears to be particularly promising is Brazzein (SEQ ID NO: 1). See also U.S. Pat. Nos. 5,346,998 and 5,527,555, PCT publications WO 94/19467 and 95/31547, and J. Caldwell et al., Solution Structure Of The Thermostable Sweet-tasting Protein Brazzein, 5 Nature Structural Biology 427–431 (1998). This protein is particularly desirable because it is stable when subjected to the level of heat typically present during baking of foods. The disclosure of these publications and of all other publications referred to herein are incorporated by reference as if fully set forth herein.

While naturally occurring Brazzein has certain desirable characteristics, there are some concerns regarding its temporal profile and the amount of the sweetener needed for threshold perception. Prior research had not been able to identify any consensus sequence or structure in Brazzein responsible for sweetness or the sweetness profile.

As described in WO 00/61759, attempts were made to improve certain sweetness characteristics of Brazzein through the substitution of Ala or Arg in replacement for an existing amino acid, and/or the addition of Ala or Arg, and/or the truncation of an existing terminal amino acid, of Brazzein. Some of these changes increased sweetness potency, while others decreased it.

Similarly, in H. Izawa et al. Pept. Sci.: Present Future, Proc. Int. Pept. Symp., 1st (1999)(Ed. Y. Shimonishi) there was a description of Ala substitutions for certain amino acids of Brazzein, with some results showing increased sweetness, while others showed decreased sweetness.

While these prior art modified Brazzein proteins are of significant interest, there is still a need for the development of other sweeteners with differing and/or improved sweetness potency and/or temporal characteristics.

SUMMARY OF THE INVENTION

The present invention provides a peptide comprising an amino acid sequence selected from the group consisting of SEQ ID NO: 3 and SEQ ID NO: 5. Another form of the invention is to provide nucleotide sequences for expressing such peptides. Our most preferred embodiments are SEQ ID NOS: 2 and 4 when expressing SEQ ID NOS: 3 and 5 in *E. coli*. However, as will be recognized by those skilled in the art, many amino acids can be expressed from other codons. Other hosts (e.g. yeast) can have improved yields when the codons are optimized for use in that host. Thus, the nucleotide sequences of the present invention are not to be limited only to the specific examples.

In accordance with the present invention it has been surprisingly learned that the replacement of a particular Asp in SEQ ID NO. 1 with Lys or Asn can create peptides with desirably improved sweetness characteristics. The sweet proteins of the present invention should be useful to sweeten consumable foods and beverages. For example, a small amount of the peptide can be mixed in a carrier such as lactose and poured into a beverage such as ice tea in order to sweeten it.

Further, production of genes coding for these peptides and their insertion into production vectors will allow large quantities to be created at low cost. Further, the genes can be inserted directly into a plant genome (and even possibly an animal genome) so that the fruit, vegetables, and/or edible meats, milk or the like may be sweeter.

The advantages of the present invention include providing improved protein sweeteners which can be detected by humans at concentrations lower than concentrations usually required for Brazzein to be detected, and genes coding for such protein sweeteners. These and still other advantages of the present invention will be apparent from the description which follows. The following description is merely of the preferred embodiments. Thus, the claims should be looked to in order to understand the full scope of the invention.

DESCRIPTION OF THE PREFERRED EMBODIMENTS

Natural Brazzein can be isolated from *Pentaliplandra brazzeana* as described in WO 94/19467. SEQ ID NO: 1 (natural Brazzein minus the beginning Glu), the Brazzein protein variants described in WO 94/19467, 95/31547 and 00/61759, and DNA coding therefor, can be obtained in accordance with the procedures described in those publications. For example, WO 00/61759 describes an especially desirable expression vector pET3a/SNase into which DNA coding for mutant Brazzein can be inserted for expression in E. coli.

Here we describe the mutation using PCR techniques with DNA coding for SEQ ID NO. 1 (the DNA being SEQ ID NO. 2, but with nucleotides 82–84 being the gac codon coding for Asp). In one case the mutation caused a replacement of the codon for Asp with the codon for Lys (aaa replacing gac). In another the mutation caused a replacement of the codon for Asp with the codon for Asn (aac replacing gac).

Restriction enzymes and T4 DNA ligase were purchased from Promega (Madison, Wis.). E. coli strains, HMS174 (DE3, recA) and BL21(DE3)/pLysS were purchased from Novagen (Madison, Wis.). Protein expression vector pET-3a was purchased from Novagen (Madison, Wis.). Purchased plasmids were stored in a non-expression host strain HMS174 and expressed in BL21(DE3)/pLysS.

Nde I and Bam HI sites were designed into the 5' and 3' ends, respectively, to permit cloning into the pET system plasmids (characterized by a T7 expression system with an optional fusion to a polyhistidine linker). In addition, a starting codon (Met) was introduced just before the first codon of the synthetic gene, since the amino acid sequence of natural Brazzein lacked an N-terminal methionine.

The DNA for SEQ ID NO. 1 was synthesized by ligating eight oligonucleotides per strand. The Nde I/Bam HI fragment of the resulting DNA, which contained the entire sequence des-Glp-Brazzein, was isolated and cloned into a T7 expression vector. The sequence of the final, ligated expression vector was confirmed by automated DNA sequencing. Mismatches due to errors during synthesis of original oligos were corrected by site-directed mutagenesis using PCR.

The synthetic Brazzein gene was cut with restriction enzymes and cloned into a T7 expression vector of the pET type which contained Nde I and Bam HI sites. The fusion construct was made with a modification of the original nuclease-ovomucoid fusion gene. A. Hinck et al., 6 Prot. Engin. 221–227 (1993).

Figure 1:
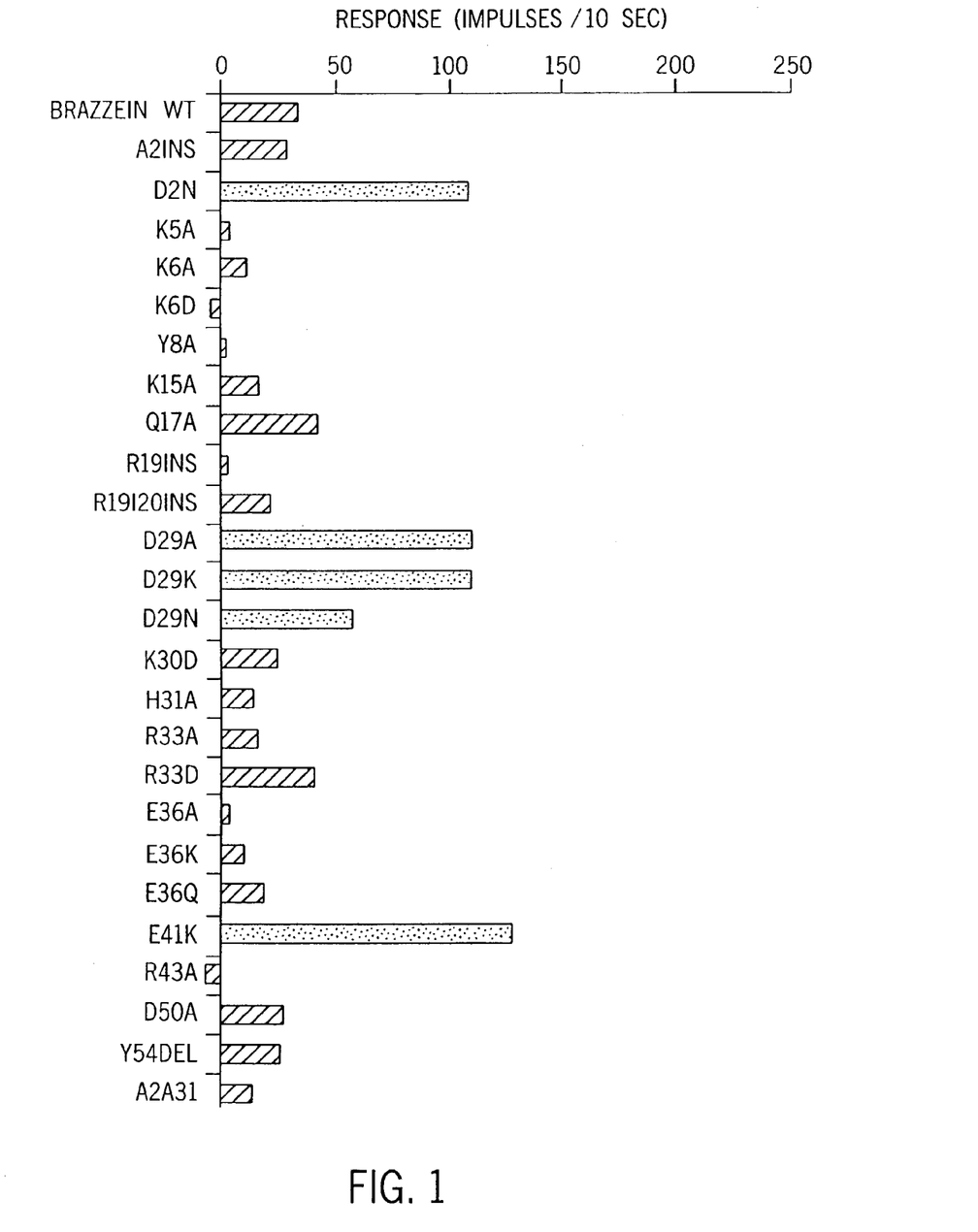
FIG. 1 is a graph depicting the responses of taste fibers predominantly responsive to sweeteners (S fibers) in the Chorda Tympani (CT) nerves of rhesus monkeys to Brazzein wild type and a number of Brazzein variants.

The four Met codons in the nuclease gene (Snase) were replaced with Ala codons by quick-change site-directed mutagenesis (kit from Stratagene, La Jolla, Calif.). The DNA fragment coding for Brazzein (or the SNase-Brazzein fusion) was excised and cloned between Nde I and Bam HI sites at the C-terminus of the modified Snase gene in the pET-3a expression system. The resulting plasmid, named pET-3a/SNase-SW (see FIG. 1 of WO 00/61759), was transformed into the E. coli strain BL21(DE3)/pLysS for protein expression. The use of pLysS in this strain permits high-level expression of the nuclease-Brazzein fusion protein without the deleterious effect of nuclease.

A single colony of E. coli strain BL21(DE3)/pLysS, containing the plasmid pET-3a/SNase-SW was selected and grown overnight at 37° C. in 5 mL of Luria Broth medium with 100 μg ampicillin/mL and 34 μg of chloramphenicol/mL. The starting culture was used to inoculate 1 L of LB medium with chloramphenicol (34 μg/mL)/ampicillin (100 μg/mL) at 37° C. until an A600 nm of 0.8–1.0 was attained.

Cells were induced for 3 hours by the addition of isopropyl-β-D-galactopyranoside (IPTG) to a final concentration of 0.2 mM. Cells were harvested and rapidly frozen in liquid nitrogen and stored at −70° C. After freeze/thawing once, 4–5 g of cells were resuspended in 50 mL lysis buffer (50 mM Tris-HCl, pH=8.0, containing 2 mM EDTA and 10 mM PMSF). The lysed cells were treated with 10 mM $CaCl_2$ for a period of 15 minutes and subject to French pressing three times. The fully broken cells were centrifuged for 15 minutes at 12,000 g. The supernatant and the pellet were analyzed on 16% Tricine gels (Novex, San Diego, Calif.). More than 70% of the fusion protein was in insoluble form.

Where protein was present in inclusion bodies, the cell pellet after the French press steps was washed three times with lysis buffer. An extra wash step was carried out to ensure further purity of the inclusion body by adding nine volumes of lysis buffer containing 0.5% (v/v) Triton X-100 and 10 mM EDTA, waiting 5 minutes, and then centrifuging at 5,000×g for 10 minutes at 4° C.

The pellet was resuspended in 50 mL 8 M guanidinium chloride containing 10 mM EDTA and 100 mM DTT and stirred for 2–3 hours at room temperature. The clear resuspension was dialyzed overnight at 4° C. against 4 L deionized water ($dH_2O$) containing 3.5 mL acetic acid (pH– 3.8–4.0) to ensure full protonation of the cysteine side chains. The precipitant was removed by centrifuging at 12,000×g.

The clear supernatant was dialyzed two more times against $dH_2O$ and acetic acid for a total period of 24 hours to completely remove the reducing agent. At this stage, more than 60–70% of the fusion protein was refolded, and the purity, as judged by gel electrophoresis, was greater that 80%. The typical yield of the fusion protein was 130–150 mg/L culture. The reduced sulfhydryl groups in the Brazzein domain were oxidized by rapidly diluting the dialyzate with 4–5 volumes of 200 mM Tris-acetic acid, pH 8.0, to a final concentration of 0.5–0.7 mg/mL (based on the SNase extinction coefficient, $\epsilon 280$, 1%=1.0), and this solution was stirred at room temperature for 24 hours. Following the oxidization step, the solution was concentrated with an Amicon ultrafiltration apparatus to a final volume of 20–50 mL. When successfully folded and oxidized, the product was a clear solution. The concentrated fusion protein was dialyzed three times against 10 L of $dH_2O$ to remove residual salt and lyophilized as white powder.

Lyophilized fusion protein (130–150 mg) was dissolved in 65–75 mL water to a final concentration of 2 mg/mL. The pH of the sample was adjusted to 1.5 by adding 1 M HCl. Approximately 70–100 mg of CNBr was added to this solution, which was then stirred in the dark at room temperature for 12 hours. The cleaved product was lyophilized 4 times out of $dH_2O$ to ensure the complete removal of CNBr.

The white powder was dissolved in double distilled water to concentration of 3 mg/ml and was applied to a reverse phase HPLC C18 column (15 cm×1 cm). By raising the percentage of the buffer (70% $CH_3CN$, 0.1% TFA) from 10 to 55, correctly folded and desalted Brazzein proteins were eluted and separated from the nuclease and uncleaved fusion protein. Brazzein-containing fractions were combined and lyophilized.

DNA sequences coding for the SEQ ID NOS. 3 and 5 Brazzein variants were prepared by site directed mutagenesis using the parental vector containing the DNA for SEQ ID NO. 1. Basically, we followed the Quick Change™ PCR kit protocol from Stratagene, with the following variations. To create the SEQ ID NOS. 2 and 4, we used the SEQ ID NOS. 6 and 7 primers for the lysine substitution and the SEQ ID NOS. 8 and 9 for the asparagine substitution, respectively.

Basically, 20 ng of template wild type Brazzein DNA was mixed with 125 ng of each of the two primers applicable to each PCR reaction. After 16 PCR cycles the reaction was treated with 10 units of Dpnl at 37° C. for one hour to remove the original template DNA.

To test the sweetness potency of SEQ ID NOS. 3 and 5, we tested the perception of sweetness using a concentration of 100 ug/ml of the protein in water. One test panel consisted of monkeys. The other test panel was of humans. The response measured in the monkeys was level of activity of taste nerve fibers during the stimulation of the tongue with different compounds being tested. Humans were requested to score the sweetness sensations of the stimuli with a magnitude labeled scale in accordance with the techniques of B. Green et al., 21 Chemical Senses 323 (1996) (e.g. barely detectable; weak; moderate; strong; very strong; strongest imaginable).

Figure 2:
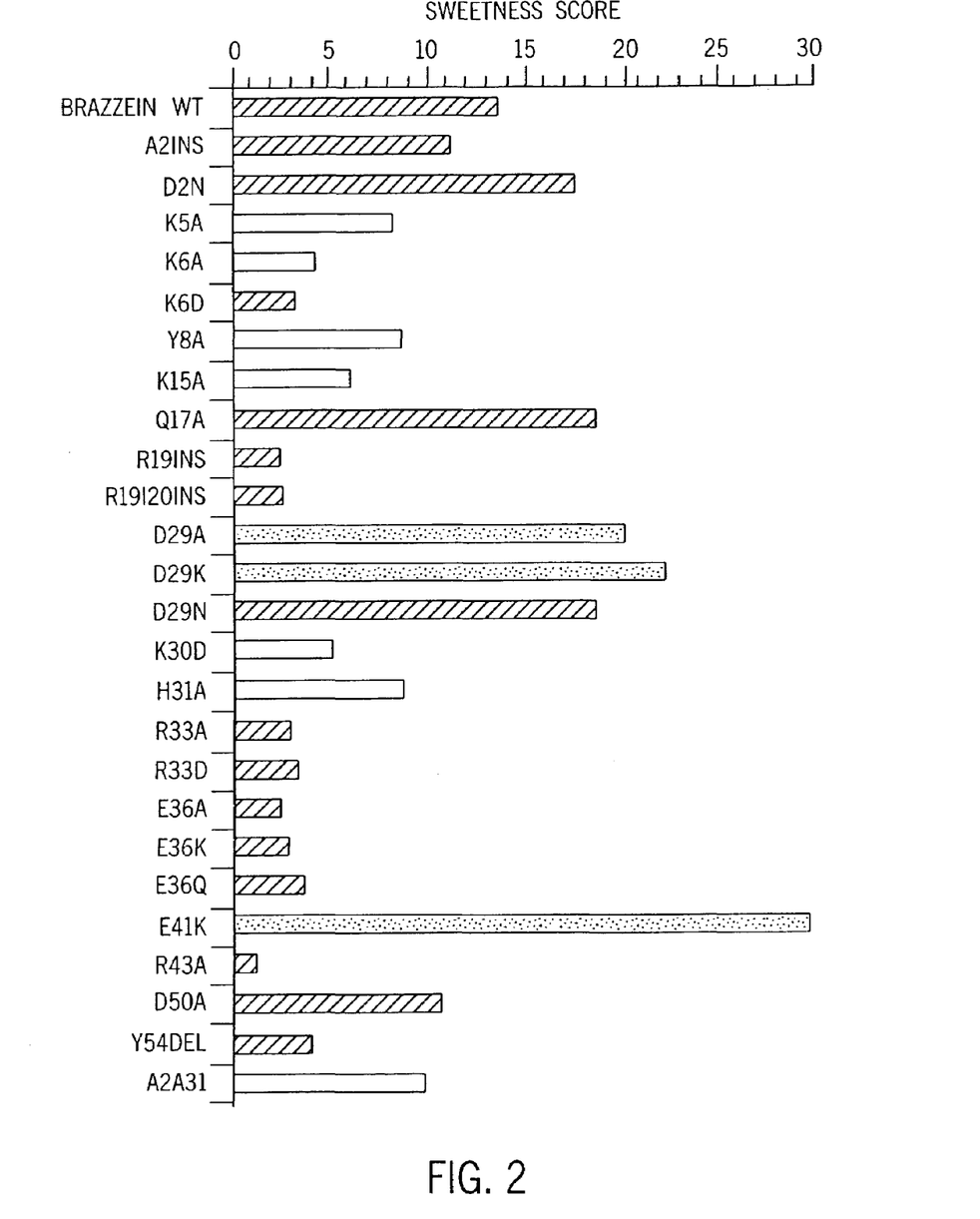
FIG. 2 is a graph depicting the responses of humans regarding the sweetness of Brazzein wild type and a number of Brazzein variants.
Figure 3:
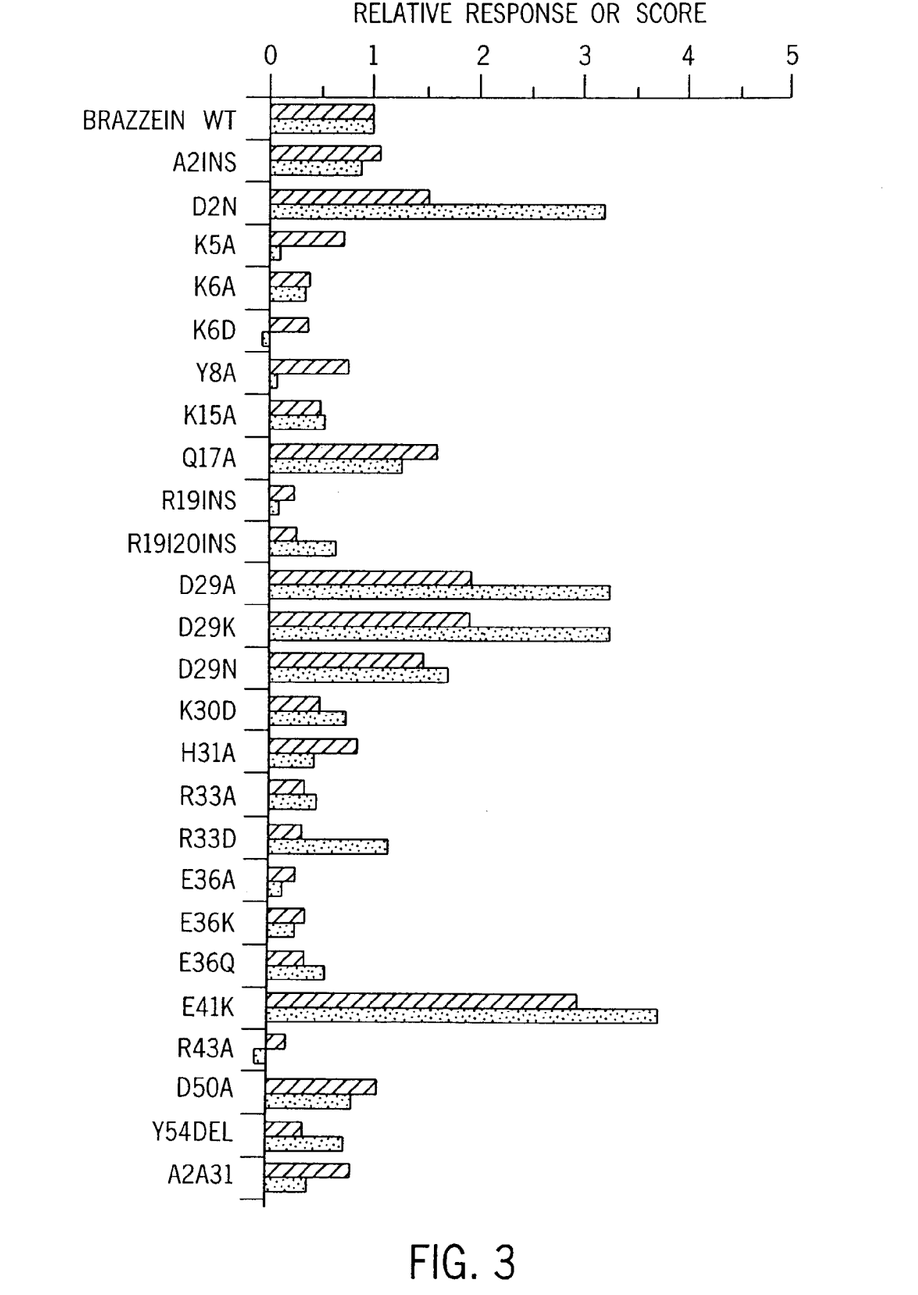
FIG. 3 depicts the correlations of results obtained with respect humans and monkeys.

The enclosed figures depict the sweetness tests of the present invention. SEQ ID NO. 3 is peptide D29K. SEQ ID NO. 5 is peptide D29N. In the nomenclature of these two peptides, and in the nomenclature of the comparative mutant peptides shown in FIGS. 1–3, the first letter is the amino acid code for the amino acid to be replaced, the last letter is the amino acid which replaces it, and the number refers to the number position of the substitution (with the number 1 amino acid being the optional Glu of SEQ ID NO. 4 of WO 95/31547, and the remaining numbers referring to the amino acids of SEQ ID NO. 1, with the Asp at the beginning therefore being deemed position number 2).

The variants D29K and D29N were about 3 to 4 times as sweet as the peptide corresponding to the recombinantly produced wild type (des-pGlul). The human panel indicated that the taste was purely sweet without detectable sourness, saltiness or bitterness. Further, the taste was reported by this panel as being clean and pleasant.

These variants therefore appear to be excellent candidates for use alone, and/or in combination with other sweeteners. When used as the peptide (instead of as a DNA sequence expressing the peptide), e.g. as a coffee sweetener, a blend of a mutant with other known sweeteners may be desirable to most closely mimic sugar.

These sweetness results are quite unexpected. In this regard, as can be seen from FIGS. 1–3, many other substitutions of a single amino acid for another single amino acid decrease sweetness potency, or have less desirable sweetness properties.

Figure 4:
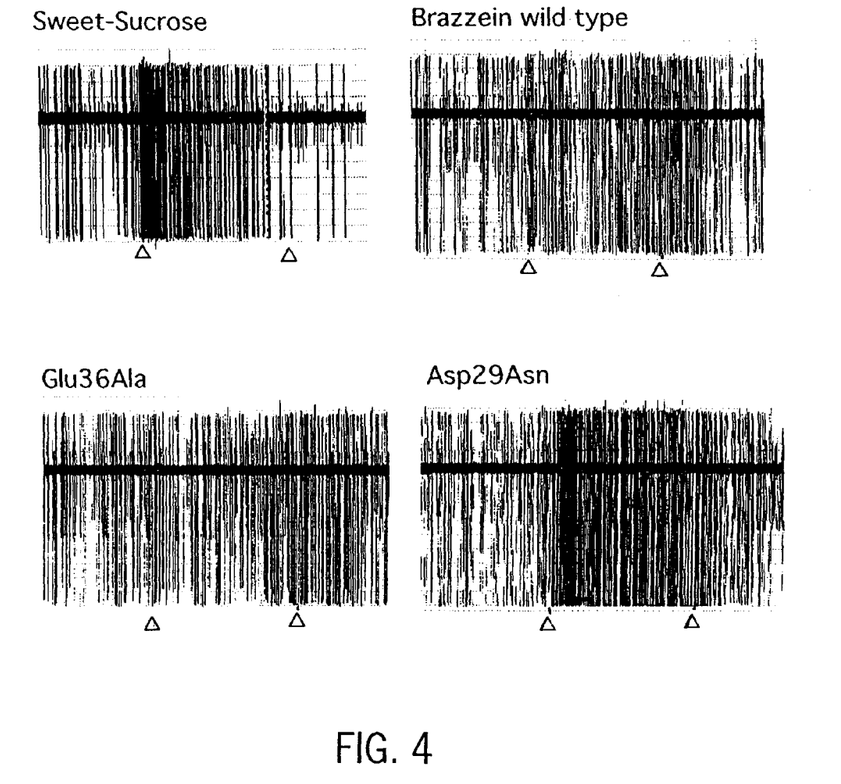
FIG. 4 depicts nerve recordings in response to a claimed Brazzein variant, another Brazzein variant, wild type Brazzein, and sucrose.

We used rhesus monkey nerves as an animal model to test primate taste responses to sweet proteins. Fiber nerve recordings from rhesus monkey Chorda Tympani nerves (FIG. 4) showed that the Asp29Asn variant had a nerve response recording profile remarkably close to that of sucrose, whereas Brazzein of the wild type and a Glu36Ala variant were more distinct from that standpoint. The triangle markings on FIG. 4 indicate exposure timing.

While the potency of a sweetener can to some extent be corrected for by adjusting the concentration used, correcting for differences in temporal profile is more difficult. Thus, it is highly desirable to have a heat stable protein sweetener with a temporal profile for sweetness response that closely matches that of sucrose.

The molecular weights of our synthetically produced peptides were checked by mass spectrometry, as well as examined the folding characteristics of the protein by $^1$H NMR. Our mutant proteins had the expected molecular weight and proper folding.

Another benefit of our proteins is that nearly one seventh of the amino acid composition of these peptides is lysine, an essential amino acid. Moreover, other Brazzein variants have shown desirable heat stability. Thus, these proteins may also be suitable for use in baking applications.

Given that these peptides are so sweet, only a very small amount of them will be needed to sweeten coffee, tea, or the like to the desired level of sweetness. For such uses, it is expected that they will be blended with a bulky filler (e.g. lactose) to give the user a feeling of perceived value and to ease consumer handling.

If one desires to produce these proteins in large quantity, one could synthesize the SEQ ID NOS: 2 and 4 sequences as noted above, or by combining standard cloning and automated synthesizer techniques (e.g. 380 B ABI DNA synthesizer). Each gene could then be cloned into an expression vector such as those described above. Such vectors could then be inserted into suitable hosts such as in the case of pGEMEX®-1 JM109 (DE3) (Promega), with expression in the usual manner.

The protein can then be harvested in the usual way (e.g. as part of a fusion protein). If desired, modifications can be made in conventional ways to reduce or eliminate undesired portions of the fusion proteins.

While production in bacteria, yeast or another cellular host is one technique, other means of producing the protein are also intended to be within the scope of the invention, such as direct synthesis using a peptide synthesizer, or synthesis in transgenic plants bearing the recombinant sequence. In this regard, as noted above, it should also be possible to insert the cDNA into plant or animal genomes using known means to cause the gene to be expressed (thereby creating sweeter fruit, vegetables or meats). Thus, when we use the term "synthetically produced peptide" we mean all of these techniques (even though a living host such as a plant, as distinguished from a laboratory vessel, might be involved).

INDUSTRIAL APPLICABILITY

The invention provides sweet proteins that can, among other things, be added to or expressed in consumable items to impart a sweet flavor.

We claim:

1. A synthetically produced peptide having a different sweetness potency from naturally occurring Brazzein, comprising an amino acid sequence selected from the group consisting of SEQ ID NO: 3 and SEQ ID NO: 5.

2. The peptide of claim 1, wherein the amino acid sequence that is selected is SEQ ID NO: 3.

3. The peptide of claim 1, wherein the amino acid sequence that is selected is SEQ ID NO: 5.

4. A nucleotide sequence capable of expressing the peptide of claim 2.

5. A nucleotide sequence capable of expressing the peptide of claim 3.

* * * * *

SEQUENCE LISTING

<160> NUMBER OF SEQ ID NOS: 9

<210> SEQ ID NO 1
<211> LENGTH: 53
<212> TYPE: PRT
<213> ORGANISM: Pentadiplandra brazzeana

```
<400> SEQUENCE: 1

Asp Lys Cys Lys Lys Val Tyr Glu Asn Tyr Pro Val Ser Lys Cys Gln
 1               5                  10                  15

Leu Ala Asn Gln Cys Asn Tyr Asp Cys Lys Leu Asp Lys His Ala Arg
            20                  25                  30

Ser Gly Glu Cys Phe Tyr Asp Glu Lys Arg Asn Leu Gln Cys Ile Cys
        35                  40                  45

Asp Tyr Cys Glu Tyr
     50

<210> SEQ ID NO 2
<211> LENGTH: 159
<212> TYPE: DNA
<213> ORGANISM: Artificial Sequence
<220> FEATURE:
<223> OTHER INFORMATION: Description of Artificial Sequence:
      Pentadiplandra brazzeana with artificial mutation
<220> FEATURE:
<221> NAME/KEY: CDS
<222> LOCATION: (1)..(159)

<400> SEQUENCE: 2 gac aaa tgt aaa aaa gta tac gaa aac tac ccg gta tcc aaa tgt cag      48
Asp Lys Cys Lys Lys Val Tyr Glu Asn Tyr Pro Val Ser Lys Cys Gln
 1               5                  10                  15 ctg gca aac cag tgt aac tac gac tgt aaa ctg aaa aaa cac gct cgt      96
Leu Ala Asn Gln Cys Asn Tyr Asp Cys Lys Leu Lys Lys His Ala Arg
            20                  25                  30 tcc ggt gaa tgc ttc tac gac gaa aaa cgt aac ctg cag tgc atc tgc     144
Ser Gly Glu Cys Phe Tyr Asp Glu Lys Arg Asn Leu Gln Cys Ile Cys
        35                  40                  45 gac tac tgc gaa tac                                                  159
Asp Tyr Cys Glu Tyr
     50

<210> SEQ ID NO 3
<211> LENGTH: 53
<212> TYPE: PRT
<213> ORGANISM: Artificial Sequence
<220> FEATURE:
<223> OTHER INFORMATION: Description of Artificial Sequence:
      Pentadiplandra brazzeana with artificial mutation

<400> SEQUENCE: 3

Asp Lys Cys Lys Lys Val Tyr Glu Asn Tyr Pro Val Ser Lys Cys Gln
 1               5                  10                  15

Leu Ala Asn Gln Cys Asn Tyr Asp Cys Lys Leu Lys Lys His Ala Arg
            20                  25                  30

Ser Gly Glu Cys Phe Tyr Asp Glu Lys Arg Asn Leu Gln Cys Ile Cys
        35                  40                  45

Asp Tyr Cys Glu Tyr
     50

<210> SEQ ID NO 4
<211> LENGTH: 159
<212> TYPE: DNA
<213> ORGANISM: Artificial Sequence
<220> FEATURE:
<223> OTHER INFORMATION: Description of Artificial Sequence:
      Pentadiplandra brazzeana with artificial mutation
<220> FEATURE:
<221> NAME/KEY: CDS
<222> LOCATION: (1)..(159)
```

```
<400> SEQUENCE: 4 gac aaa tgt aaa aaa gta tac gaa aac tac ccg gta tcc aaa tgt cag      48
Asp Lys Cys Lys Lys Val Tyr Glu Asn Tyr Pro Val Ser Lys Cys Gln
 1               5                  10                  15 ctg gca aac cag tgt aac tac gac tgt aaa ctg aac aaa cac gct cgt      96
Leu Ala Asn Gln Cys Asn Tyr Asp Cys Lys Leu Asn Lys His Ala Arg
             20                  25                  30 tcc ggt gaa tgc ttc tac gac gaa aaa cgt aac ctg cag tgc atc tgc     144
Ser Gly Glu Cys Phe Tyr Asp Glu Lys Arg Asn Leu Gln Cys Ile Cys
         35                  40                  45 gac tac tgc gaa tac                                                 159
Asp Tyr Cys Glu Tyr
         50

<210> SEQ ID NO 5
<211> LENGTH: 53
<212> TYPE: PRT
<213> ORGANISM: Artificial Sequence
<220> FEATURE:
<223> OTHER INFORMATION: Description of Artificial Sequence:
      Pentadiplandra brazzeana with artificial mutation

<400> SEQUENCE: 5

Asp Lys Cys Lys Lys Val Tyr Glu Asn Tyr Pro Val Ser Lys Cys Gln
 1               5                  10                  15

Leu Ala Asn Gln Cys Asn Tyr Asp Cys Lys Leu Asn Lys His Ala Arg
             20                  25                  30

Ser Gly Glu Cys Phe Tyr Asp Glu Lys Arg Asn Leu Gln Cys Ile Cys
         35                  40                  45

Asp Tyr Cys Glu Tyr
         50

<210> SEQ ID NO 6
<211> LENGTH: 35
<212> TYPE: DNA
<213> ORGANISM: Artificial Sequence
<220> FEATURE:
<223> OTHER INFORMATION: Description of Artificial Sequence: PCR primer
      DNA sequence

<400> SEQUENCE: 6
ctacgactgt aaactgaaaa aacacgctcg ttccg                               35

<210> SEQ ID NO 7
<211> LENGTH: 35
<212> TYPE: DNA
<213> ORGANISM: Artificial Sequence
<220> FEATURE:
<223> OTHER INFORMATION: Description of Artificial Sequence: PCR primer
      DNA sequence

<400> SEQUENCE: 7
cggaacgagc gtgttttttc agtttacagt cgtag                               35

<210> SEQ ID NO 8
<211> LENGTH: 27
<212> TYPE: DNA
<213> ORGANISM: Artificial Sequence
<220> FEATURE:
<223> OTHER INFORMATION: Description of Artificial Sequence: PCR primer
      DNA sequence

<400> SEQUENCE: 8
cgactgtaaa ctgaacaaac acgctcg                                        27
```

```
<210> SEQ ID NO 9
<211> LENGTH: 27
<212> TYPE: DNA
<213> ORGANISM: Artificial Sequence
<220> FEATURE:
<223> OTHER INFORMATION: Description of Artificial Sequence: PCR primer
      DNA sequence

<400> SEQUENCE: 9
cgagcgtgtt tgttcagttt acagtcg                                             27
```